Patented Jan. 3, 1950

2,493,703

UNITED STATES PATENT OFFICE

2,493,703

AZO GUANAMINES

Jack Theo Thurston and Donald William Kaiser, Riverside, Conn., assignors to American Cyanamid Company, New York, N. Y., a corporation of Maine No Drawing. Application May 20, 1947, Serial No. 749,358

3 Claims. (Cl. 260—153)

This invention relates to guanamines having one or more azo groups. The present application constitutes a continuation-in-part of our copending application, Serial No. 556,471, filed September 29, 1944, which in turn is a division of our copending application, Serial No. 409,148, filed August 30, 1941, now Pat. No. 2,425,286.

A number of guanamines have been prepared with various substituents. Some of these guanamines have achieved practical importance as intermediates for the preparation of synthetic resins by condensation with formaldehyde or similar aldehydes. Such resins are colorless or substantially so, and where a colored resinous material is desired, it is necessary to incorporate pigments of various kinds. There is a considerable demand for synthetic resins having colored molecules so that the resin itself is colored for use in coating compositions, plastics, pigments and the like.

When guanamines are prepared with a substituent on one of the amino groups attached to the 4- or 6-carbon atom of the ring, it is possible to form azo dyes either by diazotizing the amino-substituted guanamines and coupling with a suitable coupling component such as phenols, hydroxy carboxylic acid, and the like, or by producing substituted guanamines having substituents with groups capable of conversion into radicals suitable for azoic coupling with diazotized amines. These azo guanamines are coloring matters of various shades and can be formed into resins which are themselves colored.

Coloring matters of the present invention include the guanamine radical, that is to say, a 4,6-diamino triazine, with a substituent containing an azo group. This substituent will in general be an arylazoaromatic group in which the aromatic portion of the group may be either carbocyclic or heterocyclic. In the case of an arylazoheterocyclic compound the bond connecting to the guanamine can either be from the aryl or from the heterocyclic portion of the group. The substitution may be either on the 2-carbon atom of the triazine ring or on one of the amino groups. The compounds described and claimed in this application are characterized by the substituent being on one of the amino groups.

In general, the guanamine compounds to be diazotized and coupled in accordance with the present invention are obtained by reacting a suitable biguanide, such as p-nitrophenyl biguanide, with a suitable alkyl ester in a solvent. The resultant arylnitro aromatic substituted guanamine is reduced to a corresponding arylamino aromatic and/or arylene amino aromatic substituted guanamine which serves as the starting material for the colored compositions of the present invention.

The present invention broadly is not limited to any particular methods of forming the azo coloring matters, the ordinary methods of diazotization and coupling being applicable, insofar as the solubility of the compound permits. Some of the guanamines are not sufficiently soluble in water or aqueous alkali and require reaction in a suitable organic medium. This is an advantage of the present invention as the color chemist does not have to learn any basically new techniques.

The azo coloring matters of the present invention may have one or more guanamine radicals and one or more azo groups. In the case of polyazo compounds the usual methods of producing such polyazo compounds can be followed. Thus, for example, a polyamine may be polyazotized and coupled with a plurality of substituted guanamines or an azo guanamine can be prepared having diazotizable amino groups either by diazotizing an amino guanamine and coupling with an amino compound or by diazotizing a polyamine with a blocked amino group, coupling with a guanamine and then freeing the amino group followed by diazotization and renewed coupling, or coupling with another diazo compound. These procedures which are standard in the practical chemistry of azo dyes are applicable in producing the azo guanamides of the present invention, and again it is an advantage that no new techniques are required.

The invention will be described in greater detail in conjunction with the following specific examples which are typical illustrations. The parts are by weight.

EXAMPLE 1

*P-nitrophenylbiguanide*

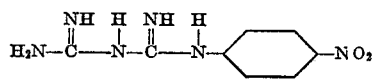

To a warm solution of 104 parts of p-nitroaniline and 60 parts of concentrated hydrochloric acid in 150 parts of water was added 71.5 parts of dicyandiamide in a period of five minutes. Heat was evolved causing the solution to boil and yellow solid commenced to separate from solution. After the initial reaction was over, the flask contained an almost solid yellow cake. An additional 100 parts of water was added and the mixture warmed on a steam bath for one hour. The flask was cooled in an ice bath, the yellow solid filtered, washed with a little water and dried in an oven. A yield of 151 parts of p-nitrophenylbiguanide hydrochloride was obtained which melted with sublimation at 258° C. The free base, prepared by the addition of sodium hydroxide solution to an aqueous suspension of the hydrochloride melted at 133° C. with decomposition.

EXAMPLE 2

*4-N-p-nitrophenyl formoguanamine*

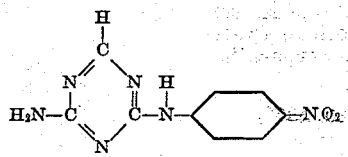

To a solution of 22.3 parts of p-nitrophenylbiguanide in a mixture of 100 parts of methanol and 50 parts of the monoethyl ether of ethylene glycol was added 10 parts of methyl formate. After standing at room temperature for three days the light yellow 4-N-p-nitrophenyl formoguanamine was filtered, washed with methanol and air dried. The yield was 65% of the theoretical and the product decomposed at 325° C.

EXAMPLE 3

*4-N-p-aminophenyl formoguanamine hydrochloride*

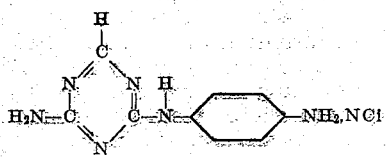

A suspension of 15 parts of 4-N-p-nitrophenyl formoguanamine in 200 parts of methanol was heated to boiling under a reflux condenser. A solution of 54 parts of stannous chloride in 60 parts of concentrated hydrochloric acid was then gradually added from the top of the condenser. The flame was removed and the exothermic reaction kept the mixture boiling. As the reaction progressed, the solid dissolved, finally giving a pale yellow solution. The hot solution was diluted with an equal volume of concentrated hydrochloric acid and placed in an ice bath to cool. Within a short time nearly colorless, minute plates separated from solution. The 4-N-p-aminophenyl formoguanamine hydrochloride was filtered, washed with cold concentrated hydrochloric acid to remove any tin salts, then with acetone, and allowed to dry, giving 10 parts of product.

EXAMPLE 4

*4-N-phenyl-4'-azo-3''-(4'''-hydroxy-diphenyl)-formoguanamine*

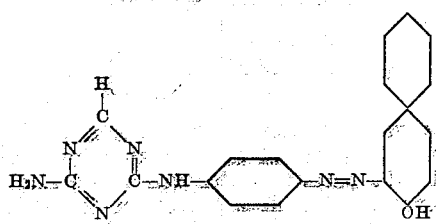

Four parts of 4-N-p-aminophenyl formoguanamine hydrochloride, prepared as in the procedure of Example 3 above, was dissolved in dilute hydrochloric acid, diazotized, and an alkaline solution containing 2.85 parts of 4-hydroxydiphenyl slowly added, the reaction mixture being kept cold. After the reaction was complete, the free dye was precipitated by acidification with acetic acid and recovered by filtering and washing with water and dried. A 53.5% yield of tan solid melting at 143° C. was obtained.

EXAMPLE 5

*4-N-4'-azophenyl-3''-(6''-hydroxybenzoic acid)-formoguanamine*

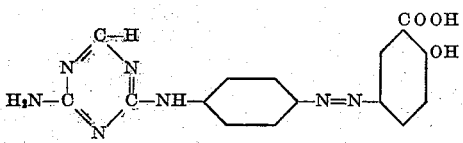

The procedure of Example 4 was followed using 5 parts of the guanamine and 2.9 parts of salicylic acid. A dark brown powder was obtained melting at about 304° C., the yield being 40.6%.

We claim:

1. An azo guanamine of the formula

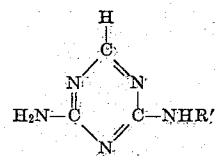

in which R' is an aryleneazoaromatic radical and the bond between the nitrogen on the 4-carbon atom of the triazine ring and R' is a nitrogen to carbon linkage.

2. 4-N-phenyl-4'-azo-3''-(4''-hydroxy-diphenyl)-formoguanamine having the formula

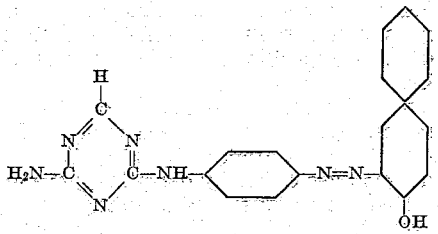

3. 4-N-4'-azophenyl-3''-(6''-hydroxybenzoic acid)-formoguanamine having the formula

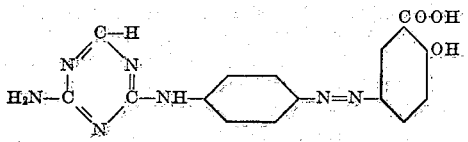

JACK THEO THURSTON.
DONALD WILLIAM KAISER.

REFERENCES CITED

The following references are of record in the file of this patent:

UNITED STATES PATENTS

| Number | Name | Date |
|---|---|---|
| 1,549,901 | Bonhote | Aug. 18, 1925 |
| 1,667,312 | Fritzche et al. | Apr. 24, 1928 |
| 1,808,849 | Hentrich et al. | June 9, 1931 |
| 1,867,451 | Gyr | July 12, 1932 |
| 2,192,127 | Ebel et al. | Feb. 27, 1940 |
| 2,258,977 | Dickey et al. | Oct. 14, 1941 |

FOREIGN PATENTS

| Number | Country | Date |
|---|---|---|
| 668,862 | France | July 23, 1929 |

Certificate of Correction

Patent No. 2,493,703 January 3, 1950

JACK THEO THURSTON ET AL.

It is hereby certified that errors appear in the printed specification of the above numbered patent requiring correction as follows:

Column 2, line 32, for "guanamides" read *guanamines* ; column 4, line 10, for "acid֊-" read *acid)-* ; column 4, line 35, for "-azo-3"." read *-azo-3"-* ;
and that the said Letters Patent should be read with these corrections therein that the same may conform to the record of the case in the Patent Office.

Signed and sealed this 2nd day of May, A. D. 1950.

[SEAL]

THOMAS F. MURPHY,
*Assistant Commissioner of Patents.*